(12) United States Patent
Kameshima (10) Patent No.: US 8,269,997 B2
(45) Date of Patent: Sep. 18, 2012

(54) DOCUMENT PROCESSING APPARATUS, PRINTING SYSTEM, DOCUMENT PROCESSING METHOD, COMPUTER-READABLE MEDIUM AND COMPUTER DATA SIGNAL

(75) Inventor: Tokuya Kameshima, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 783 days.

(21) Appl. No.: 12/418,049

(22) Filed: Apr. 3, 2009

(65) Prior Publication Data

US 2010/0067040 A1    Mar. 18, 2010

(30) Foreign Application Priority Data

Sep. 17, 2008  (JP) .................. 2008-238737

(51) Int. Cl.
H04N 1/04      (2006.01)
G06K 15/00     (2006.01)
G06K 1/00      (2006.01)
(52) U.S. Cl. ........ 358/1.14; 358/1.5; 358/498; 358/1.12
(58) Field of Classification Search .................. 400/188, 400/582; 358/400, 401, 474, 498, 500, 501, 358/403, 405, 1.14, 1.12, 1.5
See application file for complete search history.

(56) References Cited

U.S. PATENT DOCUMENTS

| | | | | |
|---|---|---|---|---|
| 4,827,349 A | * | 5/1989 | Ogata et al. | 358/434 |
| 6,168,327 B1 | * | 1/2001 | Tsuzuki | 400/188 |
| 6,486,890 B1 | * | 11/2002 | Harada et al. | 345/660 |
| 2003/0007181 A1 | | 1/2003 | Nishikawa et al. | |
| 2005/0213163 A1 | * | 9/2005 | Sotsuka | 358/400 |
| 2007/0187883 A1 | | 8/2007 | Tokashiki | |
| 2009/0251722 A1 | | 10/2009 | Kameshima | |

FOREIGN PATENT DOCUMENTS

| | | |
|---|---|---|
| JP | 07-242029 A | 9/1995 |
| JP | 09-083691 A | 3/1997 |
| JP | 2003-015844 A | 1/2003 |
| JP | 2003-303086 A | 10/2003 |
| JP | 2007-196633 A | 8/2007 |
| JP | 2008-165305 A | 7/2008 |
| JP | 2008-198091 A | 8/2008 |
| JP | 2009-251920 A | 10/2009 |

OTHER PUBLICATIONS

Japanese Office Action issued Jul. 27, 2010 in counterpart Japanese Patent Application No. 2008-238737.

* cited by examiner

Primary Examiner — Jerome Grant, II
(74) Attorney, Agent, or Firm — Sughrue Mion, PLLC (57) ABSTRACT

A document processing apparatus includes an acquiring unit and an output unit. The acquiring unit acquires first document data containing page image data corresponding to pages of a document. Each page of the document has a first end and a second end opposite to the first end. The output unit outputs second document data in which an order or a direction of the page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when page numbers of the first and second page image data have a predetermined relationship.

7 Claims, 9 Drawing Sheets

# DOCUMENT PROCESSING APPARATUS, PRINTING SYSTEM, DOCUMENT PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-238737 filed on Sep. 17, 2008.

BACKGROUND

1. Technical Field

The invention relates to a document processing apparatus, a printing system, a document processing method, a computer-readable medium and a computer data signal.

2. Related Art

Services to distribute document data containing plural pieces of page image data of a document such as a newspaper via the network have been provided. A user who receives the document data can browse the document on a terminal screen, and print it by a printer.

SUMMARY

According to an aspect of the invention, a document processing apparatus includes an acquiring unit and a document data output unit. The acquiring unit acquires first document data containing plural pieces of page image data corresponding to pages of a document. Each page of the document has a first end and a second end opposite to the first end. The document data output unit outputs second document data in which an order or a direction of the plural pieces of page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when a page number of the first page image data and a page number of the second page image data have a predetermined relationship.

BRIEF DESCRIPTION OF THE DRAWINGS

Exemplary embodiment(s) of the invention will be described below in detail based on the accompanying drawings, wherein.

DETAILED DESCRIPTION

Figure 1:
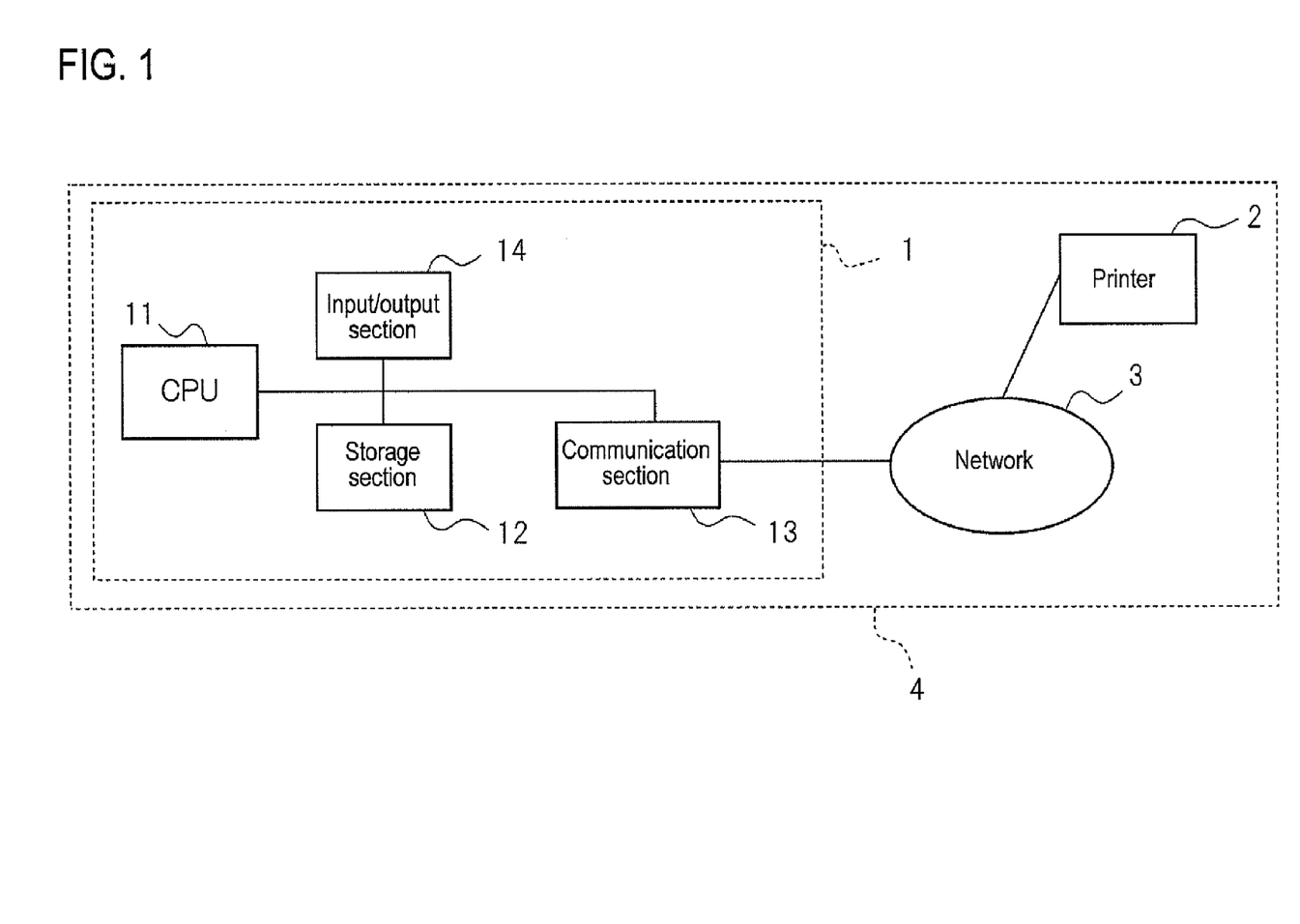
FIG. 1 is a configurative view of an example of a document processing apparatus according to an exemplary embodiment of the invention and a device connected to the document processing apparatus.

An exemplary embodiment of the invention will be explained in detail below based on the accompanying drawings. FIG. 1 is a configurative view of an example of a document processing apparatus 1 and a device connected to the document processing apparatus 1 according to this exemplary embodiment. As shown in FIG. 1, the document processing apparatus 1 includes a CPU 11, a storage section 12, a communication section 13, and an input/output section 14. The document processing apparatus 1 may be implemented by a personal computer, for example. The document processing apparatus 1 is connected to a printer device 2 via a network 3. Here, the document processing apparatus 1, the printer device 2, and the network 3 constitute a printing system 4.

The CPU 11 operates in accordance with a program stored in the storage section 12. The program may be stored in an information recording medium such as CD-ROM or DVD-ROM or may be provided via the network 3.

The storage section 12 may be implemented by a memory device such as RAM or ROM, a hard disk drive, or the like. The storage section 12 stores the above program. Also, the storage section 12 stores information input from respective sections and calculation results.

The communication section 13 may be implemented by a communicating device for establishing a communication with other equipments. The communication section 13 inputs information received from other equipments into the CPU 11 and/or the storage section 12 under control of the CPU 11, and transmits information to other equipments.

The input/output section 14 may be implemented by a display/output device such as monitor, a keyboard, and a mouse, an input device, and the like. The input/output section 14 outputs image data, etc. to the monitor or the like under control of the CPU 11, and acquires information from an operator through the keyboard, the mouse, or the like.

The printer device 2 forms an image on a sheet (recording medium) such as a paper. The printer device 2 prints (outputs) image data or the like on a sheet such as a paper under control of the document processing apparatus 1. The printer device 2 is connected to the communication section 13 of the document processing apparatus 1 via the network 3. The printer device 2 may be connected to the document processing apparatus 1 via a printer cable or the like.

The network 3 may be implemented by LAN or the like to establish a communication between the document processing apparatus 1 and the printer device 2, and others. The network 3 may include the Internet.

Here, the document processing apparatus 1 may constitute a part of the printer device 2. This is because it does not a matter whether or not the document processing apparatus 1 and the printer device 2 are housed in the same casing.

Figure 2:
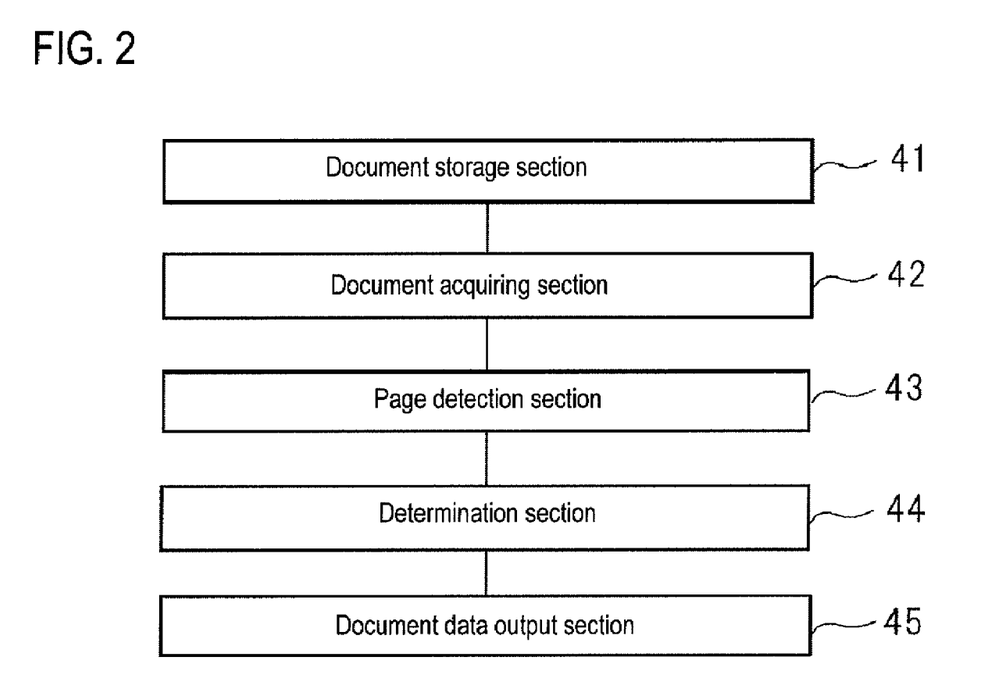
FIG. 2 is a functional block diagram showing functions that the document processing apparatus according to the exemplary embodiment realizes.

FIG. 2 is a functional block diagram showing functions that the document processing apparatus 1 according to this exemplary embodiment realizes. The document processing apparatus 1 functionally has a document storage section 41, a document acquiring section 42, a page detection section 43, a determination section 44, and a document data output section 45. These functions are implemented by having the CPU 11 execute the program stored in the storage section 12 to control the communication section 13, the input/output section 14 and the printer device 2.

Figure 4:
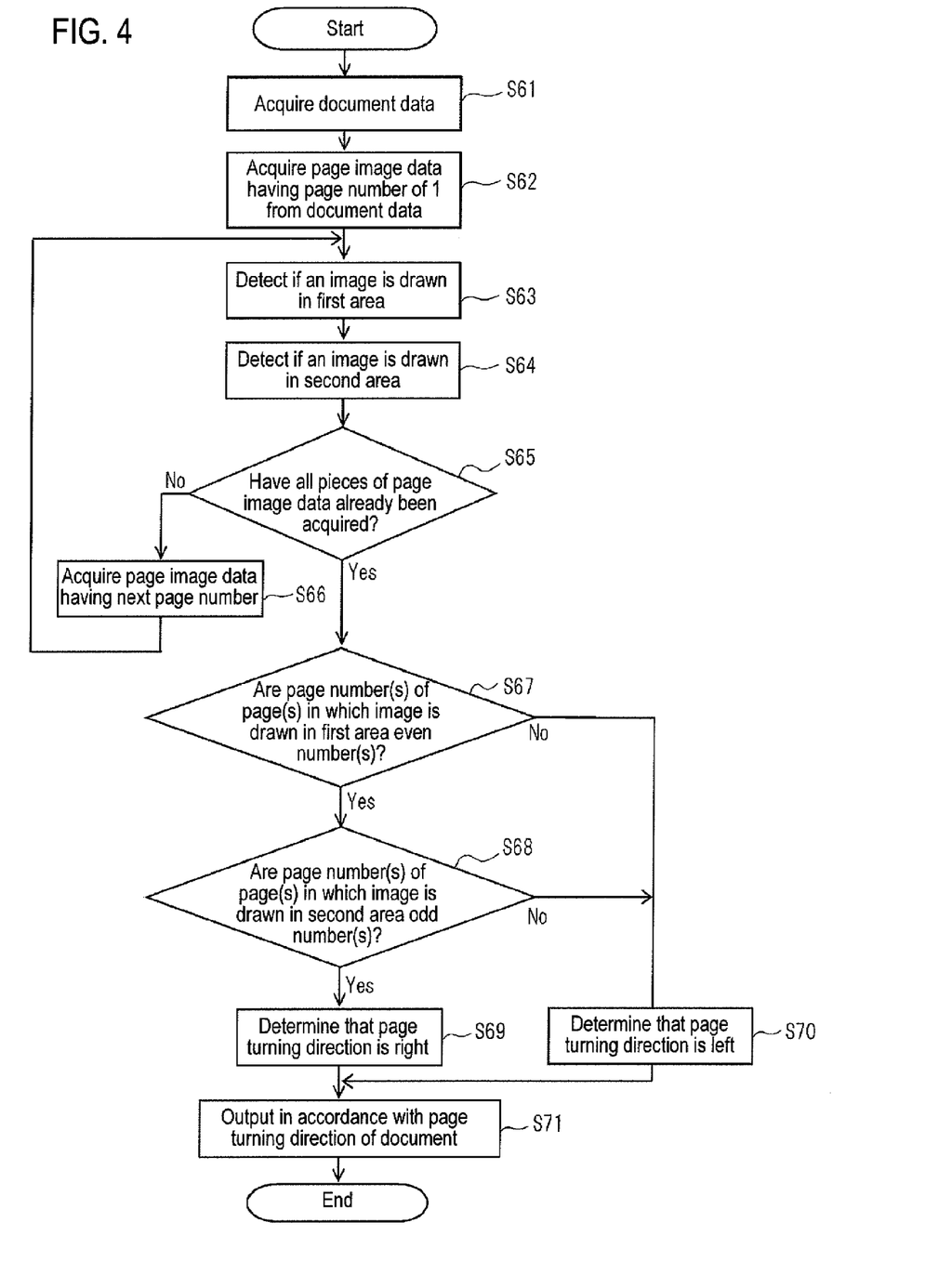
FIG. 4 is a flowchart explaining an example of a process flow of the document processing apparatus according to this exemplary embodiment.

FIG. 4 is a flowchart explaining an example of a process flow of the document processing apparatus 1 according to this exemplary embodiment. Then, operations of respective functional blocks will be explained with reference to FIG. 4 below.

The document storage section 41 is implemented mainly by the CPU 11 and the storage section 12. The document storage section 41 stores document data containing plural pieces of page image data. Also, although the document storage section 41 is arranged as a part of the document processing apparatus 1, the document storage section 41 may be arranged in other equipment and may be called by another function via the communication section 13, the network 3, and the like.

Figure 3:
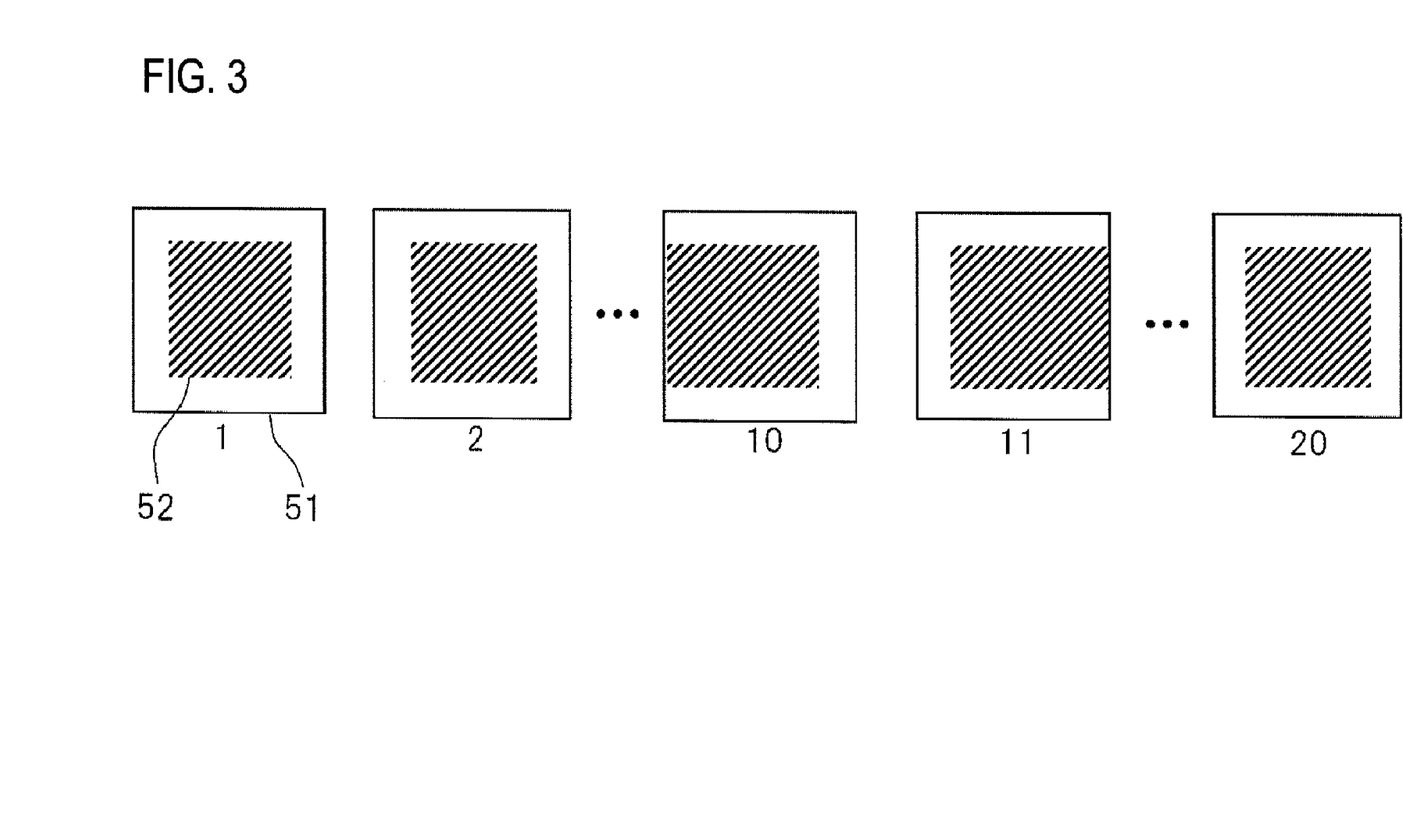
FIG. 3 is a view showing an example of document data stored in a document storage section.

FIG. 3 is a view showing an example of the document data stored in the document storage section 41. The document data is data that contains plural pieces of page image data 51 and that are image data corresponding to respective pages of the document. In FIG. 3, respective pieces of page image data 51 are represented by rectangular areas, and the pieces of page image data 51 are arranged from left to right in order of page numbers that are given in portions under the rectangular areas. Each drawing area 52 in FIG. 3 contains a text area and/or an image area, for example. For example, a document may be a centerfold printed document (e.g., a document such as a newspaper in which sheets are double folded) or may be a bound printed document. Examples of the bound printed document include a dual-page print document, a document prepared by binding double-side printed papers (printing one-page data on each of front and back surfaces) by staples, and the like.

Figure 5:
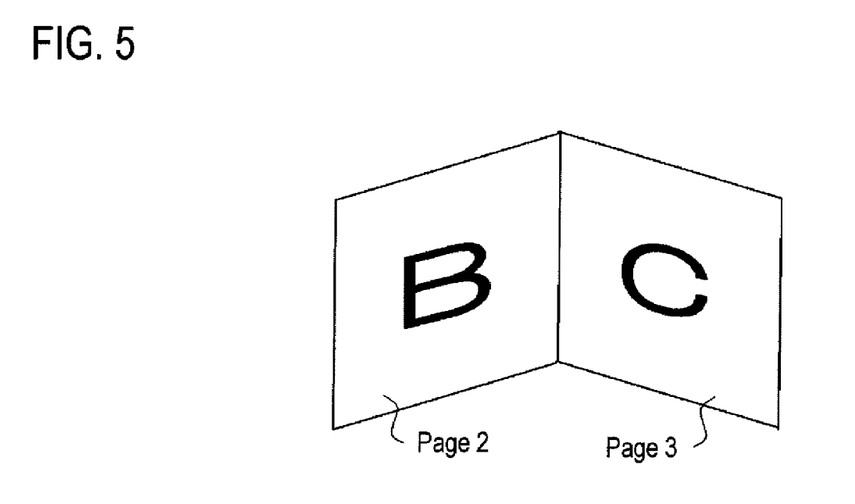
FIG. 5 is a view showing a relationship among a left-side bound document (a page is turned from right to left), and page numbers and page images.
Figure 6:
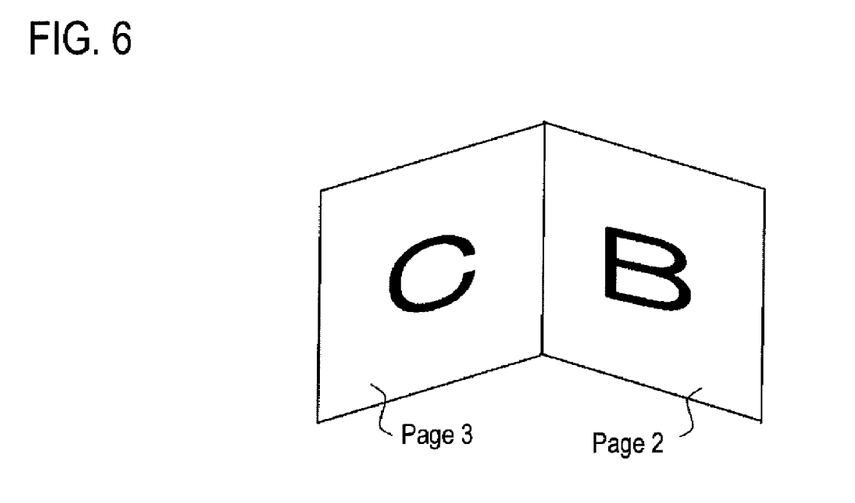
FIG. 6 is a view showing a relationship among a right-side bound document (a page is turned from left to right), page numbers and page images.

FIG. 5 is a view showing a relationship among a left-side bound document (a page is turned from right to left), page numbers and page images. FIG. 6 is a view showing a relationship among a right-side bound document (a page is turned from left to right), page numbers and page images. Here, the term "page image" means an image for one page represented by the page image data 51. FIGS. 5 and 6 show the case where the number of pages of a document is four. In FIGS. 5 and 6, pages 2 and 3 constitute a double-page spread (two facing pages), a page image of page 1 (may be referred to as a "front cover" hereinafter) is output on the back side of the page 2, and also a page image of page 4 (may be referred to as a "rear cover" hereinafter) is output on the back side of the page 3. Also, in a left-side bound document, page 2 is arranged on the left side of a double-page spread and page 3 is arranged on the right side thereof whereas, in a right-side bound document, page 2 is arranged on the right side of a double-page spread and page 3 is arranged on the left side thereof. Also, this rule is not limited to right-side bound documents and left-side bound documents, but this rule is true for upper-side bound documents (in which a page is turned from a lower side to an upper side) and lower-side bound documents (in which a page is turned from an upper side to a lower side). Specifically, in an upper-side bound document, page 2 is arranged on the upper side of a double-page spread and page 3 is arranged on the lower side thereof whereas, in a lower-side bound document, page 2 is arranged on the lower side of a double-page spread and page 3 is arranged on the upper side thereof. Here, a style in which a page is turned from left to right, a style in which a page is turned from right to left, and the like are referred to as a "page turning direction" hereinafter. Specifically, a page turning direction of a style in which a page is turned from left to right is right, whereas a page turning direction of a style in which a page is turned from right to left is left. Also, a page turning direction of a style in which a page is turned from a lower side to an upper side is upward, whereas a page turning direction of a style in which a page is turned from an upper side to a lower side is downward.

Here, the above relationship among, the page turning direction, the page number and the page image is true for the case where the number of pages increases. It is assumed that the number of pages is 4n (n is an integer equal to or larger than 2). In this case, page 2k (k is an integer equal to or larger than 1) and page 2k+1, e.g., page 2 and page 3, page 4 and page 5, and so on, constitute a double-page spread. The pages constituting each double-page spread are arranged in order of page numbers in a direction corresponding to the page turning direction in each double-page spread. As can be seen from FIGS. 5 and 6, for example, when a page turning direction is left, page images are arranged in an ascending order of page numbers in the direction from left to right in each double-page spread. Similarly, for example, when a page turning direction is right, page images are arranged in the direction from right to left. Also, for example, when a page turning direction is upward, page images are arranged in the direction from an upper side to a lower side.

The document acquiring section 42 is implemented mainly by the CPU 11 and the storage section 12. The document acquiring section 42 acquires document data from the document storage section 41 (S61). Also, the document acquiring section 42 may acquire the document data by receiving the document data transmitted from other equipment via the communication section 13, for example.

The page detection section 43 is implemented mainly by the CPU 11 and the storage section 12. The page detection section 43 acquires plural pieces of page image data 51 from the document data acquired by the document acquiring section 42, and detects a piece of page image data 51 indicating that an image is drawn in a particular area of a page image from the plural pieces of acquired page image data 51. An operation of the page detection section 43 will be explained with reference to the process flow in FIG. 4. First, the page detection section 43 acquires a piece of page image data 51 having page number of 1 from the document data (S62).

The page detection section 43 (an example of a first detection unit) detects first page image data indicating that an image is drawn in a first area 53 corresponding to a first end (S63). Specifically, the page detection section 43 determines as to whether or not "an image is drawn" in the first area 53 of the page image indicated by the piece of page image data 51 acquired in S62. Here, if any image is drawn in the first area 53, the page detection section 43 may determine that "an image is drawn". However, in this exemplary embodiment, if an image that is meaningful in determining a page turning direction is drawn, the page detection section 43 determine that "an image is drawn". Details of determination about that "an image is drawn" will be described later.

Figure 7:
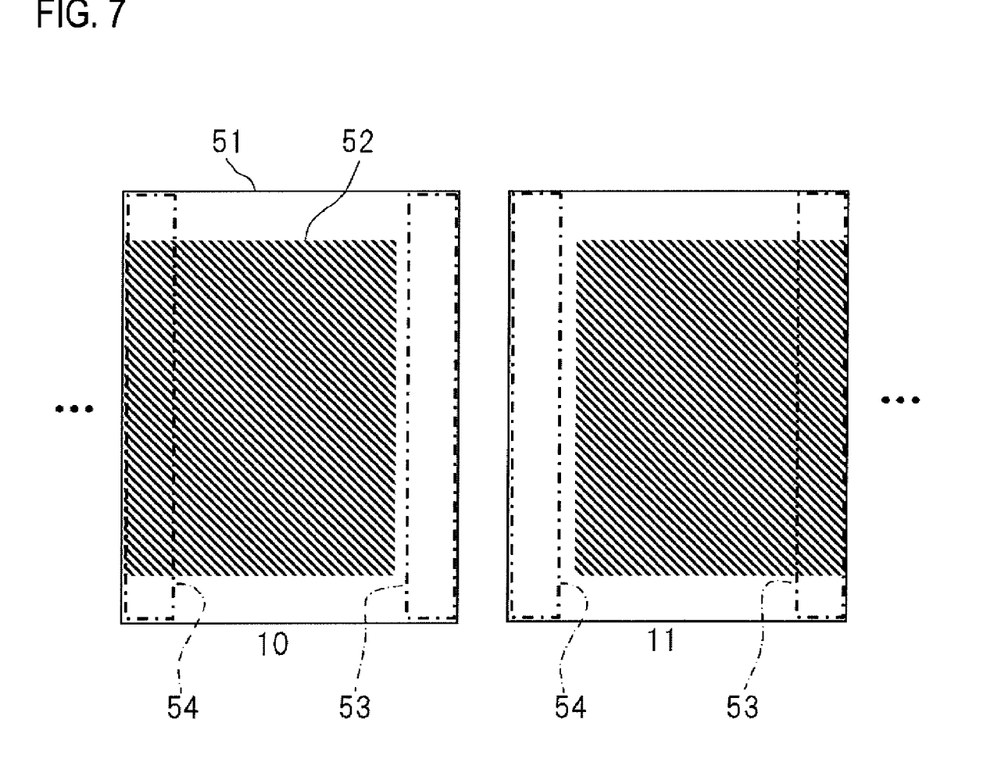
FIG. 7 is a view explaining a first area and a second area.

FIG. 7 is a view explaining the first area 53 and a second area 54. FIG. 7 shows pieces of page image data 51 corresponding to pages 10 and 11 of the document shown in FIG. 4. Each first area 53 is an area that corresponds to a right end (an example of the first end) of a page image indicated by a piece of page image data 51. In this exemplary embodiment, each first area 53 is an area having a predetermined width (e.g., 5 mm) from a right-end side of a rectangular page image.

Figure 8:
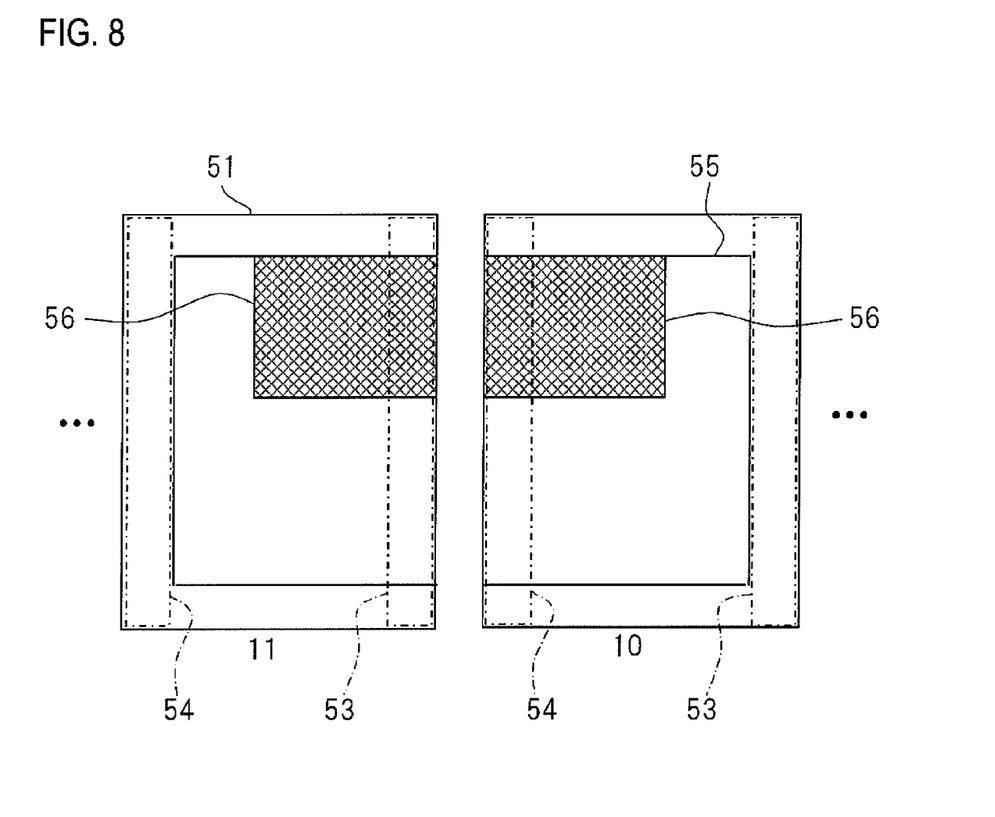
FIG. 8 is a view explaining an example of page image data indicating that images are drawn in the first area and the second area, respectively.

The page detection section 43 (an example of the first detection unit) determines as to whether or not an image is drawn in the first area 53, based on an amount of detected lines. As a method of detecting lines, there is a method using the edge detection, for example. FIG. 8 shows an example of pieces of page image data 51 indicating that image 56 is drawn in the first area 53 and the second area 54. FIG. 8 shows the pieces of page image data 51 corresponding to the pages 10 and 11 of the document shown in FIG. 4. Since the page turning direction of the document represented by the document data in FIG. 8 is right, the pages 10 and 11 are arranged on the right side and the left side, respectively for the purpose of facilitation of the explanation. In each page, a part of a frame line 55 and the image 56, which are drawn to bridge the pages of the double-page spread, are arranged. When the edge detection is performed for the first areas 53 of such pieces of page image data 51, edge-detected are, for example, a horizontal line that is drawn in the first area 53 of the page 11 and corresponds to the frame line 55 (the first area 53 in the page 11 also serves as a portion constituting a center portion of the double-page spread) and a horizontal line that is a boundary line between the image 56 and a peripheral blank portion of the image 56. The page detection section 43 extracts a line extending in the horizontal direction, out of the edge-detected lines. When the line extending in the horizontal direction is extracted, if the page turning direction is left or right, a horizontal line corresponding to the frame line 55, which bridges the double-page spread, is detected, but a page number, a mark in a blank portion, and the like are not detected. There is a situation that a line extending in the horizontal direction may be deviated a predetermined angle due to a reading error of a scanner, or the like. Therefore, an allowable range of an angle between an extracted line and a horizontal direction may be set in advance. The page detection section 43 determines, for each piece of page image data 51, as to whether or not an amount of lines that are detected from the first area 53 and extend in the horizontal direction exceeds a threshold value, and then stores a page number of the page image data 51 in the storage section 12 if the amount of lines is larger than the threshold value (S63). Specific examples of the amount of lines include a total sum of lengths of lines, the number of lines, and the like.

The page detection section 43 (an example of a second detection unit) detects second page image data indicating that an image is drawn in the second area 54 corresponding to a second end (S64). More specifically, the page detection section 43 determines as to whether or not an image is drawn in the second area 54 of a page image indicated by the piece of page image data 51 acquired in S62. Since a most part of a method for determining as to whether or not an image is drawn is similar to the first detection unit (S63), a determination method will be described below with focusing a different portion therebetween.

With reference to FIG. 7, the second area 54 will be described below. Each second area 54 is an area that corresponds to the left end (an example of a second end) of a page image indicated by a piece of page image data 51. In this exemplary embodiment, each second area 54 is an area having a predetermined width (e.g., 5 mm) from a right-end side of a rectangular page image.

The page detection section 43 (an example of the second detection unit) determines as to whether or not an image is drawn in the second area 54, based on a method using the edge detection, for example. This method will be described with reference to FIG. 8 below. When the edge detection is performed for the second areas 54 of the pieces of page image data 51 shown in FIG. 8, edge-detected are a horizontal line that is drawn in the second area 54 in page 10 and corresponds to the frame line 55 (the second area 54 in the page 10 also serves as a portion constituting a center portion of the double-page spread) and a horizontal line that is a boundary line between the image 56 and a peripheral blank portion of the image 56. The page detection section 43 extracts a line extending in the horizontal direction, out of the edge-detected lines. The page detection section 43 determines, for each piece of page image data 51, as to whether or not an amount of lines that are detected from the second area 54 and extend in the horizontal direction exceeds a threshold value, and then stores a page number of the page image data 51 in the storage section 12 if the amount of lines is larger than the threshold value (S64).

The page detection section 43 determines as to whether or not all pieces of page image data 51 have already been acquired (S65). If all page image data 51 have not been acquired yet (No in S65), the page detection section 43 acquires the page image data 51 having the next page number (S66), and applies the processes subsequent to S63 to the acquired page image data 51. In contrast, if all pieces of page image data 51 have already been acquired and the processes of the first and second detection units have been executed therefore (Yes in S65), the process of the page detection section 43 is terminated, and then a process result is transferred to the determination section 44 via the storage section 12.

In S63 and S64, in stead of a method of making a determination based on whether or not an mount of lines (a total sum of lengths of lines or the number of lines) is larger than a certain threshold value, a method of making a determination based on whether or not an amount of lines detected from the first area 53 or the second area 54 is ranked in the top "s" ("s" is a predetermined natural number) among the plural pieces of page image data 51 may be employed.

Also, in S63 and S64, it is determined as to whether or not an image is drawn in the first area 53 or the second area 54, based on the method using the edge detection. However, another method may be employed. For example, it may be determined as to whether or not an image is drawn, based on whether or not a density in each area exceeds a predetermined reference density. Specifically, it may be determined as to whether or not an image is drawn, based on whether or not a value that represents a density in the first area 53, for example, an average density or an area occupied by black pixels in a binary image, exceeds a reference value.

In the above description, each first area 53 is an area having the predetermined width from the right-end side of a rectangular page image. However, for example, a piece of page image data 51 may be detected depending on a position in which a page number is drawn. Specifically, for example, when page numbers are given at lower corners of the facing pages (double-page spread), the first area 53 may be an area having a predetermined width from the left-end side of a page image and having a predetermined width from the lower-end side of the page image, and the second area 54 may be an area having a predetermined width from the right-end side of the page image and having a predetermined width from the lower-end side of the page image.

The determination section 44 is implemented mainly by the CPU 11 and the storage section 12. The determination section 44 determines as to whether or not a page number of the page image data 51, which is detected by the page detection section 43 (an example of the first detection unit), and a page number of the page image data 51, which is detected by the page detection section 43 (an example of the second detection unit) have a predetermined relationship. Specifically, the determination section 44 determines as to whether or not the page number(s) of the page image data 51, which are determined by the page detection section 43 that an image is drawn in the first area 53 thereof, are even numbers (S67). If the page number(s) of the page image data 51, which are determined by the page detection section 43 that an image is drawn in the first area 53 thereof, are even numbers (Yes in S67), the determination section 44 further determines as to whether or not page number(s) of the page image data 51, which are determined by the page detection section 43 that an image is drawn in the second area 54 thereof, are odd numbers (S68). If the page number(s) of the page image data 51, which are determined by the page detection section 43 that an image is drawn in the second area 54 thereof, are odd numbers (Yes in S68), the determination section 44 determines that the page turning direction of the document is right (S69). In contrast, if either of the conditions specified in S67 and S68 is not satisfied (No in S67 or No in S68), the determination section 44 determines that the page turning direction of the document is left (S70).

Instead of the above determination method, the determination section 44 may determine that the page turning direction of the document is right only when an image is drawn in the first area 53 of a page having a page number of 2j (j is a natural number equal to or larger than 1) and an image is drawn in the second area 54 of a page having a page number of 2j+1, for example. Also, the determination section 44 may not determine a page turning direction, but may determine directly an output method in the document data output section 45 described later.

The document data output section 45 is implemented mainly by the CPU 11, the storage section 12, and the communication section 13. The document data output section 45 outputs document data for document output that is based upon the pieces of page image data 51 corresponding to the respective pages of the document, in accordance with the determination result by the determination section 44 (S71). Specifically, the document data output section 45 generates the document data for document output by changing a sequence or a direction of the page image data 51 in accordance with the page turning direction of the document for which the determination has been made, and outputs the generated document data. The output document data is read into a device that outputs the document, and is output as a document. In outputting the document data as the document, the document data for document output may be transmitted to the printer device 2 via the communication section 13 and then may be printed as a bound printed document or a centerfold printed document, for example, or may be displayed on a screen via the storage section 12 in accordance with another program, for example. Also, the document data for document output may be sent to another computer or the like via the communication section 13, and then may be output as the document.

Details of changing an order of the pieces of page image data 51 executed by the document data output section 45 will be described below. As can be seen from FIGS. 5 and 6, for example, a position of the first page (in the case shown in FIG. 6, the page 1 located on the back side of the page 2) in the document whose page turning direction is right corresponds to the last page (in the case shown in FIG. 5, the page 4 located on the back side of the page 3) in the document whose page turning direction is left, and the relationship between the page numbers is given in reverse order. Therefore, for example, when the determined page turning direction is right but when the printer device 2 can print only a document whose page turning direction is left, the document data output section 45 outputs document data from which new page image data 51 can be read in a descending order of page numbers from the largest page number. In other words, the document whose page turning direction is right is printed based on the document data in which page numbers are arranged in a reverse order. In contrast, when the determined page turning direction is left, the document data output section 45 outputs document data in which an order of the pieces of page image data 51 is kept as it is. Also, when double-page spreads (facing pages) of a document indicated by document data are collectively displayed on a screen, since the page arrangement is different in each double-page spread, the page order may be changed so that the page arrangement is corrected appropriately.

Figure 9:
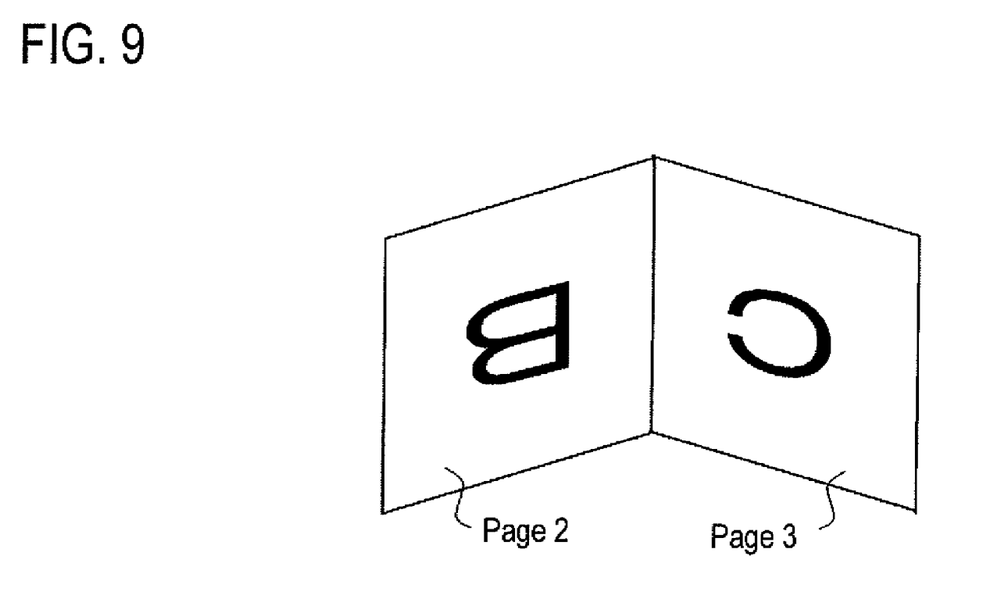
FIG. 9 is a view showing a document obtained by rotating an individual page image 180 degrees in each sheet of paper and then outputting the individual images by a output method for a left-side bound document.

Changing the direction of the page image data 51 executed by the document data output section 45 will be further described below. The document data output section 45 outputs document data containing pieces of page image data obtained by rotating the pieces of page image data 51 by a predetermined rotation angle. This predetermined angle may be set to 180 degree, for example. FIG. 9 is a view showing a document in which respective page images are rotated on a sheet of paper by 180 degrees and then are output as a left-side bound document. In this case, the contents of the individual pages are turned upside down. Therefore, when the viewer's line of sight is turned on a sheet of paper by 180 degrees, the page 2 is located on the right side of the double-page spread and the page 3 is located on the left side thereof, so that a document in which the pages are arranged from right to left in the order of page numbers on the double-page spread, i.e., a document having such a document attribute that a page is turned from left to right is output. An angle of turn (rotation) is not always set to 180 degrees, but it is desirable that the viewer of the document can recognize the turn of the positional relationship between the page images at that angle. Since the page numbers are not changed in this method, even if stapling is performed, a binding style is same as a document whose page turning direction is left, e.g., a sheet of paper on which a tip of the staple appears is same.

Here, the above method can be applied even when the number of pages increases. Furthermore, the relationship between the pages in the printed document is not changed if either the centerfold printing or the bookbinding printing (e.g., papers that are subjected to the centerfold printing and the double-side printing are bound) is used. Therefore, even if a bookbinding method is changed, it is not necessary to change the above method. Also, for example, when the printer device 2 can print both a left-side bound document and a right-side bound document, the document data output section 45 may output the document data containing data that specifies the page turning direction to the printer device 2.

Also, the document data output section 45 may generate the document data in which the pieces of page image data 51 are imposed after an order or a direction of the pieces of page image data 51 is changed, and then may output the generated data to the printer device 2 or the like.

In this exemplary embodiment, it is determined as to whether the page turning direction is right or left, and the document data is output in accordance with this determined page turning direction. Similarly, it may be determined as to whether the page turning direction is upward or downward, and document data may be output in accordance with this determined page turning direction. In this case, the portions concerning the left or right direction in the above described process may be changed to the upward or downward direction.

Also, in the above exemplary embodiment, the page detection section 43 and the determination section 44 determine the page turning direction, based on whether or not an image is drawn in the first area 53 or the second area 54 of the page image data 51 of the document. Alternatively, the page turning direction may be determined by determining as to whether or not a document corresponding to document data is written vertically or horizontally. In this case, when it is determined that the document is written vertically, the page turning direction is right, while when it is determined that the document is written horizontally, the page turning direction is left.

Figure 10:
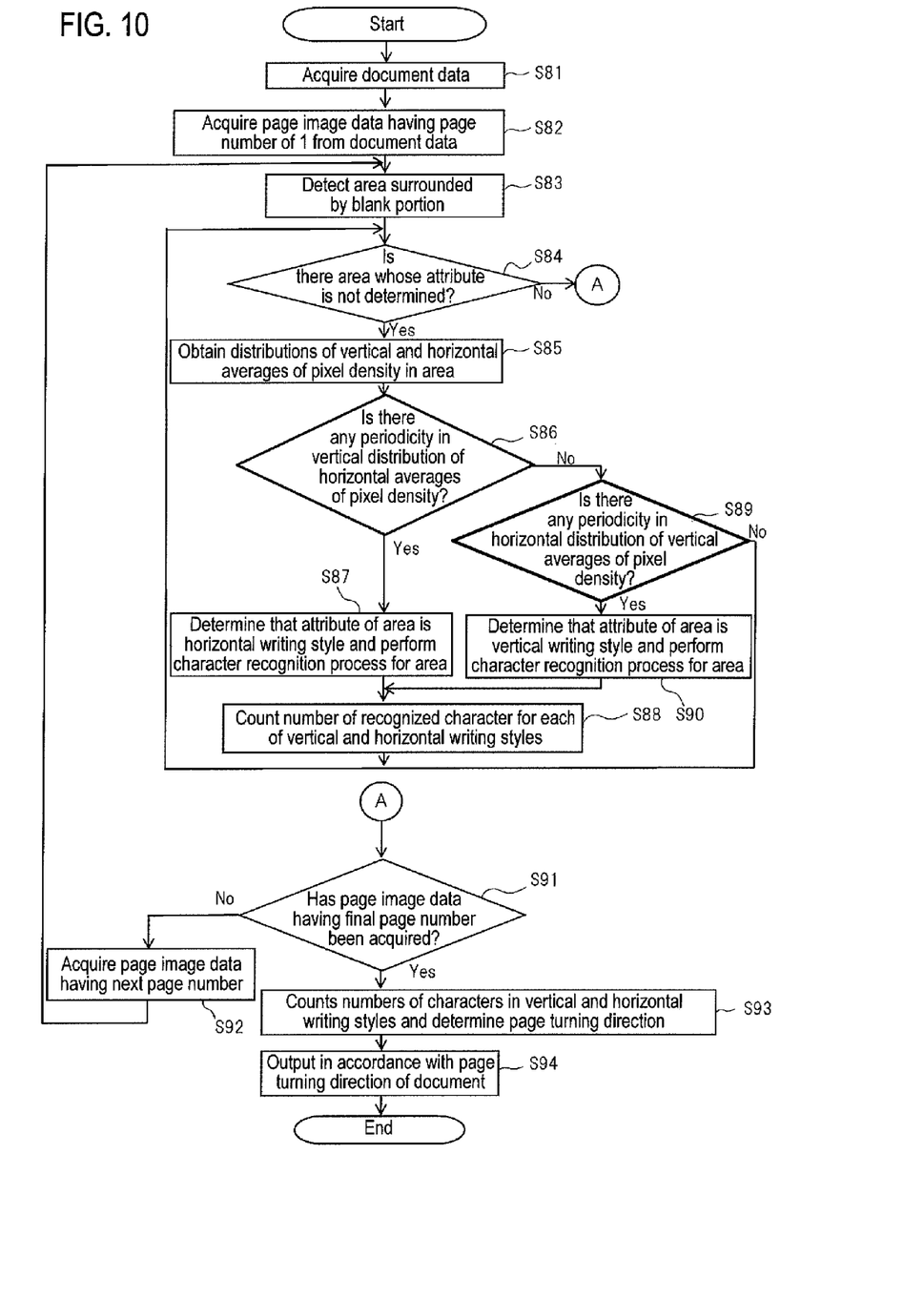
FIG. 10 is a flowchart explaining an example of a process flow for determining a page turning direction based on which a vertical writing style or a horizontal writing style is used.

FIG. 10 is a flowchart explaining an example of a process flow in determining the page turning direction by determining as to whether a document is written vertically or horizontally. In the following description, the process will be described with reference to the process flow shown in FIG. 10 and the functional block shown in FIG. 3. As to the functional block, different portions from the above exemplary embodiment will be mainly described.

The document acquiring section 42 acquires document data from the document storage section 41 (S81). The page detection section 43 detects an amount of a vertical writing area and an amount of a horizontal writing area in respective pieces of page image data 51. Specific description on this detection will be given in description on a process of the page detection section 43. The page detection section 43 acquires a piece of page image data having a page number of 1 from the document data (S82). Then, the page detection section 43 detects an area of an image that is surrounded by a blank portion that extends in a vertical direction or a horizontal direction (S83). The page detection section 43 determines an attribute of each detected area, that is, which a vertical writing style, a horizontal writing style, and an image each detected area belongs to. Then, the page detection section 43 determines as to whether or not there is an area whose attribute is not determined (S84). If there is an area whose attribute is not determined (Yes in S84), the page detection section 43 calculates a horizontal distribution of a vertical average of a pixel density and a vertical distribution of a horizontal average of a pixel density in one detected area (S85). Then, the page detection section 43 determines as to whether or not the vertical distribution of the horizontal average of the pixel density has periodicity (S86). If the vertical distribution of the horizontal average of the pixel density has periodicity (Yes in S86), the page detection section 43 determines that the attribute of the area is the horizontal writing style, and executes a character recognizing process for that area (S87). Then, the page detection section 43 counts the number of recognized characters as the number of characters in the horizontal writing style (S88). In order to determine the periodicity in S86, it may be checked as to whether or not there exists a peak of wavelength in a certain range, by using the Fourier transform, for example. In contrast, if the vertical distribution of the horizontal average of the pixel density has no periodicity (No in S86), the page detection section 43 determines as to whether or not the horizontal distribution of the vertical average of the pixel density has periodicity (S89). If the horizontal distribution of the vertical average of the pixel density has periodicity (Yes in S89), the page detection section 43 determines that an attribute of that area is the vertical writing style, and executes the character recognizing process for that area (S90). Then, the page detection section 43 counts the number of recognized characters as the number of characters in the vertical writing style (S88). Then, the processes from S84 are performed again. In the determination in S89, if the horizontal distribution of the vertical average has no periodicity (No in S89), the processes from S84 are performed again. In order to determine an attribute of an area, that is, which the vertical writing style or the horizontal writing style is used in an area, instead of the above method, the character recognition may be performed premised on the vertical writing style or the horizontal writing style prior to the determination of the attribute, and the attribute may be determined based on information regarding a precision of the character recognition.

In contrast, if there is no area whose attribute is not determined (No in S84), the page detection section 43 determines as to whether or not a piece of page image data having the final page number has been acquired (S91). If the piece of page image data having the final page number has not been acquired (No in S91), the page detection section 43 acquires a piece of page image data 51 having the next page number from the document data (S92), and repeats the processes from S68 for the newly acquired page image data 51. In contrast, if the piece of page image data having the final page number has already been acquired (Yes in S91), the determination section 44 determines the page turning direction based on a sum of the numbers of characters in the vertical writing style (an example of the amount of the vertical writing area) and a sum of the numbers of characters in the horizontal writing style (an example of the amount of the horizontal writing area) (S93). Specifically, for example, if the sum of the numbers of characters in the vertical writing style is larger than a reference character number, the document is determined as the vertical writing style; otherwise, the document is determined as the horizontal writing style. Also, if the document is determined as the vertical writing style, the page turning direction is determined as the right direction; otherwise, the page turning direction is determined as the left direction. Alternatively, if the sum of the numbers of characters in the vertical writing style is larger than that in the horizontal writing style, the document may be determined as the vertical writing style; otherwise, the document may be determined as the horizontal writing style, and the page turning direction may be determined correspondingly. The document data output section 45 outputs document data used to output a document corresponding to the document data as a document having the determined page turning direction, based on the result of determining the page turning direction (S94).

In the above example, as the amount of the vertical writing area and the amount of the horizontal writing area, the number of characters contained in respective areas is employed. Instead, a sum of sizes such as areas of the vertical writing area and the horizontal writing area may be employed.

What is claimed is:

1. A document processing apparatus comprising:
   an acquiring unit that acquires first document data containing plural pieces of page image data corresponding to pages of a document, wherein each page of the document has a first end and a second end opposite to the first end; and
   a document data output unit that outputs second document data in which an order or a direction of the plural pieces of page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when a page number of the first page image data and a page number of the second page image data have a predetermined relationship;

a first detection unit that detects the first page image data from the first document data;

a second detection unit that detects the second page image data from the first document data; and a determination unit that determines whether or not the page number of the first page image data and the page number of the second page image data have the predetermined relationship, wherein the document data output unit outputs the second document data in which the order or the direction of the plural pieces of page image data is changed based on a determination result by the determination unit.

2. The document processing apparatus according to claim 1, wherein the first detection unit detects the first page image data based on an amount of lines detected from the first area of each page, and the second detection unit detects the second page image data based on an amount of lines detected from the second area of each page.

3. The document processing apparatus according to claim 2, wherein the first detection unit detects the first page image data based on the amount of lines that are detected from the first area of each page and extend in a predetermined direction, and the second detection unit detects the second page image data based on the amount of lines that are detected from the second area of each page and extend in the predetermined direction.

4. The document processing apparatus according to claim 1, wherein the first detection unit detects the first page image data based on a density in the first area of each page, and the second detection unit detects the second page image data based on a density in the second area of each page.

5. A printing system comprising:

an acquiring unit that acquires first document data containing plural pieces of page image data corresponding to pages of a document, wherein each page of the document has a first end and a second end opposite to the first end; and a printing unit that prints second document data in which an order or a direction of the plural pieces of page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when a page number of the first page image data and a page number of the second page image data have a predetermined relationship;

a first detection unit that detects the first page image data from the first document data;

a second detection unit that detects the second page image data from the first document data; and a determination unit that determines whether or not the page number of the first page image data and the page number of the second page image data have the predetermined relationship, wherein the printing unit prints the second document data in which the order or the direction of the plural pieces of page image data is changed based on a determination result by the determination unit.

6. A non-transitory computer-readable medium storing a program causing a computer to execute document processing, the document processing comprising:

acquiring first document data containing plural pieces of page image data corresponding to pages of a document, wherein each page of the document has a first end and a second end opposite to the first end; and outputting second document data in which an order or a direction of the plural pieces of page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when a page number of the first page image data and a page number of the second page image data have a predetermined relationship;

detecting the first page image data from the first document data;

detecting the second page image data from the first document data; and determining whether or not the page number of the first page image data and the page number of the second page image data have the predetermined relationship, wherein the second document data in which the order or the direction of the plural pieces of page image data is changed based on a result of the determining is output.

7. A document processing method comprising:

acquiring first document data containing plural pieces of page image data corresponding to pages of a document, wherein each page of the document has a first end and a second end opposite to the first end; and outputting second document data in which an order or a direction of the plural pieces of page image data is changed, when the first document data contains first page image data indicating that an image is drawn in a first area corresponding to the first end of at least one of the pages of the document and second page image data indicating that an image is drawn in a second area corresponding to the second end of at least one of the pages of the document and when a page number of the first page image data and a page number of the second page image data have a predetermined relationship;

detecting the first page image data from the first document data;

detecting the second page image data from the first document data; and determining whether or not the page number of the first page image data and the page number of the second page image data have the predetermined relationship, wherein the second document data in which the order or the direction of the plural pieces of page image data is changed based on a result of the determining is output.

* * * * *